Feb. 8, 1944.  J. R. ROBERTS ET AL  2,340,986
MEANS FOR MOUNTING VEHICULAR ROAD WHEELS
Filed Sept. 9, 1941

Inventors,
J. R. Roberts &
G. M. Roberts
By: Glascock Downing & Seebold

Patented Feb. 8, 1944

2,340,986

UNITED STATES PATENT OFFICE 2,340,986

MEANS FOR MOUNTING VEHICULAR ROAD WHEELS

John Rees Roberts and Gwladys May Roberts, Taunton, England

Application September 9, 1941, Serial No. 410,222 In Great Britain Sept. 9, 1940

4 Claims. (Cl. 29—84)

The object of this invention is to facilitate changing the wheel of a vehicle, more particularly in the dark and when circumstances prohibit or make impossible the proper illumination of the studs by which the wheel is fixed to the vehicle. It is applicable to vehicles in which the wheel is to be secured to a permanent hub or like member by means of screw-threaded studs or bolts, hereinafter referred to as studs, projecting from the latter and passing through holes in the wheel.

The invention consists of a more or less flexible extension piece, preferably comprising a closely coiled spring, temporarily or permanently secured to one of the wheel studs, and adapted to guide the wheel before the other studs engage therein, the said extension piece being passed through one of the said holes before the wheel comes into contact with the other studs. The combined stiffness and flexibility of the spring enable this to be done without difficulty.

The device may consist of the following parts: a nut or other connector to engage with the outer end of the wheel stud, a flexible member, such as a closely coiled spring, fitted to the outer end of the nut or connector, and a tapered nipple or cap, which may be fitted to the outer end of this flexible member.

Where the wheel studs are of uniform diameter throughout their length, the connector may comprise a nut in the form of a thin sleeve of steel or other suitable material of high tensile strength, internally screw-threaded to engage over the parallel wheel stud, and one stud hole in the wheel may be reamered out to suit the diameter of the sleeve, unless, of course, the stud holes are already large enough to accommodate the sleeve. The connector, to which the flexible portion of the device is coupled, is screwed into the outer end of the sleeve, or the internally threaded sleeve may be an integral part of the connector. The tapered nipple may be so dimensioned as to act as a feeler gauge for the identification of the stud hole that has been reamered out.

Alternatively the outer end of the wheel bolt may be reduced in diameter, and the connector may be internally screw-threaded and screwed on to this reduced portion. Another possibility would be to engage a male-ended connector in a recess provided in the outer end of the wheel bolt, for instance to drill and tap a hole in the latter and screw a connector into it. This arrangement however would be open to the objection that the hole or recess in the stud might become choked with road dust, mud or grease.

Various embodiments of the invention are illustrated by way of example in the accompanying drawing, in which.

Figure 1:
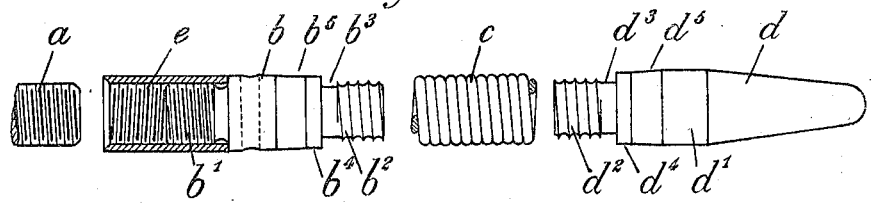
Figure 1 shows partly in outside elevation and partly in axial section a form of the invention suitable for fitting to existing cars.

In the form of construction illustrated in Figure 1, $a$ is the free end of the wheel stud to which the device is to be attached, $b$ is the connector to be attached thereto, $c$ is the flexible member, consisting of a closely coiled steel spring, the inner end of which is fitted to the outer end of the connector, that is to say, to the end remote from the permanent hub, and $d$ is the tapered nipple or cap attached to the free outer end of the flexible member. The connector $b$ and the nipple $d$ may be made of brass, and the complete device chromium-plated. To attach the connector $b$ to the unaltered bolt $a$, the outer end of a thin-walled sleeve $e$ of stainless steel, screw-threaded internally, is screwed onto a threaded tenon $b^1$ provided at the inner end of the connector $b$, and may conveniently be permanently fixed thereto. When required for use the open end of the sleeve $e$ is screwed onto the free end of one of the wheel bolts $a$. The inner end of the flexible closely coiled steel spring $c$ is screwed at one end onto a helically grooved tenon $b^2$ projecting from the outer end of the connector, and the outer end onto a similar helically grooved tenon $d^2$ projecting from the rear or inner end of the nipple $d$.

When the flexible member $c$ is a closely coiled steel spring it may conveniently be of about 14 gauge for a device of relatively small diameter, and 12 gauge or heavier for larger types. The section of the wire used for the spring may be round, as shown in the drawing, or of some other shape, such as square, if deemed preferable. The overall length of the device may conveniently be about ten or twelve inches. In coupling the spring to the nipple and to the connector, advantage has been taken of the well known principle that a closely coiled spring can easily be screwed onto a helically grooved member if the spring is rotated in the direction in which it was coiled, but will not unscrew when turned in the opposite direction. This facilitates assembling the device in the course of manufacture, but prevents accidental dismantling of the parts if force should have to be used to uncouple the device from the stud. The provision of plain-turned portions $b^3$ and $d^3$ of the connector and nipple, between the threaded portions $b^2$, $d^2$ and the parallel shoulders $b^4$, $d^4$ at the base of the tapers $b^5$, $d^5$, simplifies mass production of these components.

When the form of connector illustrated in Figure 1 is used, one of the stud holes in each wheel may have to be reamered out, but it has been found that the maximum amount of metal that it will be necessary to remove is not more than $47/1000$ths of an inch, and frequently considerably less. The removal of this small amount of metal would not affect the strength or behaviour of the wheel. The nipple used with this form of the device comprises a portion $d^1$ of the same diameter as the sleeve $e$, so that it can pass through the hole that has been reamered out, but not through the other bolt holes, unless, of course, they are all large enough to accommodate the sleeve.

Figure 3:
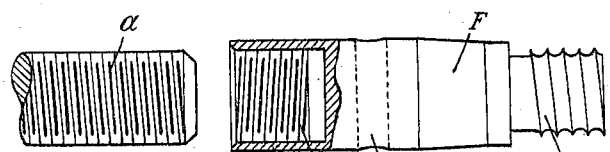
Figure 3 shows on a larger scale a third form of connector.

The connector F shown in Figure 3, is equivalent in use to the connector $b$ of Figure 1 when combined with the sleeve $e$. The annular wall $F^3$ of the nut should be as thin as is compatible with the requisite strength. This connector, including the annular wall, may advantageously be made of mild steel, and the complete device cadmium-plated.

Figure 2:
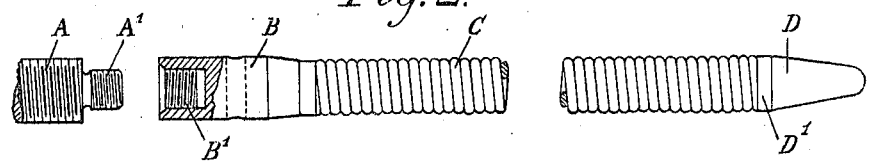
Figure 2 is a similar view of a modification which may advantageously be adopted for new cars.

In the embodiment illustrated in Figure 2 the outer end of the wheel stud A is reduced in diameter and externally screw-threaded at $A^1$, and the connector B is drilled and tapped at $B^1$ so that it can be screwed directly on to the reduced end of the stud. Apart from the necessity of providing the special form of stud shown in Figure 2, this modification of the device simplifies its production and also obviates the necessity for reamering stud holes, as the outside diameter of the connector B would be the same as the main diameter of the stud. In this form, too, a simplified type of nipple or cap D may be used for the free end of the flexible member, as the maximum diameter of the nipple, at the part $D^1$, would not need to be any greater than that of the spring C. It will be found most convenient for all the wheel bolts to be reduced and threaded in this manner, so that the device can be attached to any one of them at will.

The outside diameter of the flexible member $c$, Figure 1, or C, Figure 2, is slightly less than the maximum diameter of the associated connector, which in turn, is slightly less than the inside diameter of the stud hole that has to pass over it. This clearance between spring and stud hole is considered advisable to allow for the easy flexing of the spring when passing through the stud hole and for possible slight variations that may occur in outside diameters in the manufacture of the springs. The flexible member, represented in the accompanying drawing as a close-coiled spring, may alternatively consist for example of an india rubber hose, a solid round india rubber bar, metallic tubing, flexible steel or other metallic rope, or closely woven cord.

In certain motor vehicles, left-hand threaded studs are fitted to one side of the vehicle and right-hand threaded studs to the other. In such a case two devices would be necessary if the form shown in either Figure 1 or Figure 3 were used, one device having a right-hand thread and the other a left-hand thread.

To enable these to be identified by touch at night the nipple or cap $d$ or D on the left-hand threaded device may conveniently be fluted along its tapered free end, or a groove cut circumferentially around it at some convenient point near its extremity, the nipple or cap of the right-hand threaded device being left plain, as shown in the accompanying drawing.

If the form shown in Figure 2 were used, the reduced outer ends of the studs on both sides of the vehicle could all be threaded in the same direction, irrespective of the direction in which the main diameters of those studs were threaded, and one device only would be needed, instead of two as in the case of Figures 1 and 3.

The object of the tapered nipple or cap, $d$ or D, is to facilitate threading the flexible device through the stud hole. As an alternative to providing this nipple, the flexible member itself may be formed with a tapered end. In such a case the main diameter of the connector may conveniently be fluted longitudinally where necessary to serve as a means of identification of left-hand threaded devices, the connector on similar but right-hand threaded devices being left plain.

In some forms of the invention the flexible member may be integral with the connector, or with the nipple, or with both.

Figure 4:
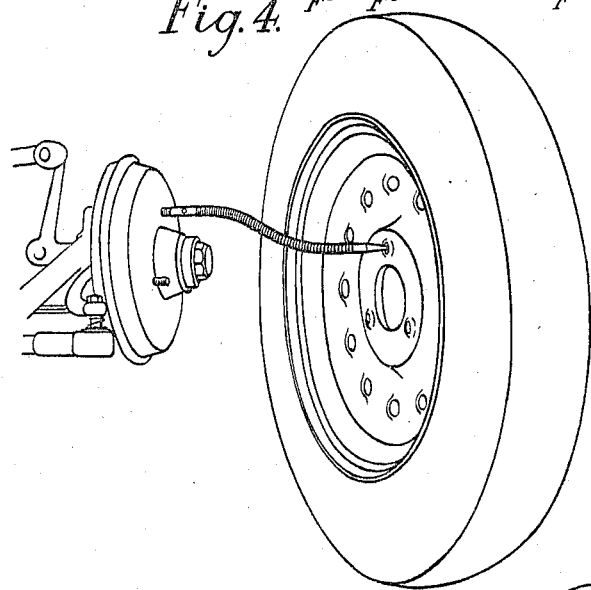
Figure 4 is a perspective view of a hub and a spare wheel about to be mounted thereon by means of the device according to the invention.

The device, in the form illustrated in Figure 1, or with the connector illustrated in Figure 3, is used in the following manner: After the wheel for which the spare wheel is to be substituted has been removed, the device is fitted on to the topmost wheel stud, and, with the spare wheel standing on the ground, the nipple is threaded through the reamered-out hole, as shown in Figure 4, the part $d^1$ of the nipple being of such a diameter as to act as a feeler gauge for the identification of this hole. The person fitting the wheel then lifts the wheel towards the hub, the device guiding the wheel into the proper position. As soon as the wheel has been pushed so far as to come into contact with the ends of the other wheel studs, the person fitting the wheel is relieved of the weight, since the wheel will hang on the connector. The wheel is then swung lightly to left or right until the remaining holes slip over the corresponding studs, whereupon it is pushed right home, and the nuts are screwed on to the studs. The extension piece may then be removed. The purpose of the diametral hole in the connector, as shown at $F^5$ in Figure 3, is merely to assist in the present method of manufacture.

If preferred, two adjacent studs may be provided with devices according to the invention. When the two corresponding stud holes are engaged over these studs, no further rocking will be required in order to bring the other stud holes into their correct positions. In general, however, one will be found sufficient, since, if the stud to which the device is fitted is set at top centre before the wheel is lifted towards the hub, it will be found that all studs enter their corresponding stud holes as the topmost stud hole passes over the connector.

With the form of construction illustrated in Figure 2 the step of identifying a particular bolt hole by using the nipple as a feeler gauge is not required.

In the forms of the invention in which an extension piece is permanently fixed to one of the wheel studs, this stud will be moved round to the top before the stud hole in the wheel is brought into engagement with it. This would also be required with the embodiment shown in Figure 2, if only one bolt was reduced and threaded as described above.

Without such a device as this invention it is essential that all studs be engaged with their stud holes simultaneously, and possibly the greatest difficulty encountered in mounting a spare wheel is to hold the wheel steady while one sets it so that all stud holes are exactly opposite their studs before the wheel is brought into contact with the stud ends. It is this steady holding and careful setting of a heavy wheel that makes it so very difficult for most women drivers to change a wheel in the dark, and it can, at times, be almost as difficult for most men. After the device according to this invention has been provided on the wheel stud, however, the frailest competent woman driver should be capable of mounting a wheel in complete darkness with all the speed of a skilled mechanic working under good daylight conditions.

Such a device as this would be of considerable assistance to the motorised units of the armed forces, and also to those engaged in the civil defence services, particularly during action at night.

We claim:

1. A device to facilitate changing the wheel of a vehicle, wherein a plurality of wheel studs projecting from the vehicle are adapted to engage through corresponding holes in the wheel, and wherein one of the wheel openings is enlarged to facilitate use of the device, said device comprising a connector adapted to engage with and surround the outer end of a wheel stud, a flexible closely coiled spring fitted to the outer end of the connector, and a nipple, tapered outwardly at its free end, fitted to the outer end of the spring, the base diameter of said nipple being of a size to enter the enlarged wheel opening only.

2. To facilitate changing the wheel of a vehicle, wherein a plurality of wheel studs projecting from the vehicle are adapted to engage through corresponding holes in the wheel, the outer end of at least one of the wheel studs being turned down to a smaller diameter and externally screw-threaded, a device comprising a connector internally screw-threaded at its inner end and adapted to be screwed on to the reduced outer end of a wheel stud, and a flexible closely coiled spring fitted to the outer end of the connector.

3. To facilitate changing the wheel of a vehicle, wherein a plurality of wheel studs projecting from the vehicle are adapted to engage through corresponding holes in the wheel, a device comprising a connector internally threaded at its inner end and adapted to be screwed on to any one of the wheel studs, a helically grooved tenon at the outer end of the connector, a closely coiled spring screwed directly on to the said helically grooved tenon, and a nipple, the inner end of which is formed as a helically grooved tenon and screwed directly into the outer end of the said spring, the free end of the said nipple being tapered.

4. To facilitate changing the wheel of a vehicle, wherein a plurality of wheel studs projecting from the vehicle are adapted to engage through corresponding holes in the wheel, a device comprising a connector internally threaded at its inner end and adapted to be screwed on to any one of the wheel studs, a helically grooved tenon at the outer end of the connector, and a closely coiled spring screwed directly on to the said helically grooved tenon, the free outer end of the spring being tapered outwardly to a nipple-like form.

JOHN REES ROBERTS.
GWLADYS MAY ROBERTS.